United States Patent

Tischler

[11] Patent Number: 5,074,773
[45] Date of Patent: Dec. 24, 1991

[54] ADJUSTABLE GASKET ALIGNMENT BLOCK

[75] Inventor: Robert Tischler, Northwood, N.H.

[73] Assignee: Davidson Textron Inc., Dover, N.H.

[21] Appl. No.: 507,858

[22] Filed: Apr. 12, 1990

[51] Int. Cl.$^5$ .............. B29C 41/04; B29C 41/22; B29C 41/34

[52] U.S. Cl. .................... 425/134; 249/65; 264/310; 264/DIG. 60; 277/181; 425/425; 425/434; 425/435; 425/DIG. 47

[58] Field of Search ............... 425/434, 435, 425, 186, 425/DIG. 47, DIG. 112, 182, 134; 249/65, 160; 264/245, 310, DIG. 60; 277/166, 226, 181, 184, 189

[56] References Cited

U.S. PATENT DOCUMENTS

| | | | |
|---|---|---|---|
| 2,183,004 | 12/1939 | Boyd | 277/184 |
| 2,388,925 | 11/1945 | Messinger | 277/184 |
| 4,610,620 | 9/1986 | Gray | 425/434 |
| 4,783,302 | 11/1988 | Kurimoto | 264/245 |
| 4,854,994 | 8/1989 | Breiter et al. | 425/DIG. 47 |
| 4,869,658 | 9/1989 | Tsutsumi et al. | 277/181 |
| 4,925,151 | 5/1990 | Gray | 425/434 |

Primary Examiner—Jay H. Woo
Assistant Examiner—Khanh P. Nguyen
Attorney, Agent, or Firm—John C. Evans

[57] ABSTRACT

An assembly (10) for molding a two-tone, thin-walled plastic shell (12) for parts such as automobile door panels, control and instrument panels and the like includes a charge box (24) for supplying dry thermoplastic material to separate casting surfaces (30, 32) on a heated mold (22) selectively connected to the charge box (24) during the casting process. A pressurized inflatable seal gasket (60) is connected to the charge box (24) for sealing a division surface (36) on the heated mold (22) which surface (36) separates the casting surfaces (30, 32) of the mold (22). The seal gasket (60) is attached to the charge box (24) on a divider wall (42) via a sliding member (80) which positions the seal gasket (60) longitudinally along the divider wall (42). The sliding member (80) is secured to the divider wall (42) via threaded pins (86). The gasket seal (60) may be removed and reinserted in the slider member (80) providing automatic adjustment thereof.

17 Claims, 2 Drawing Sheets

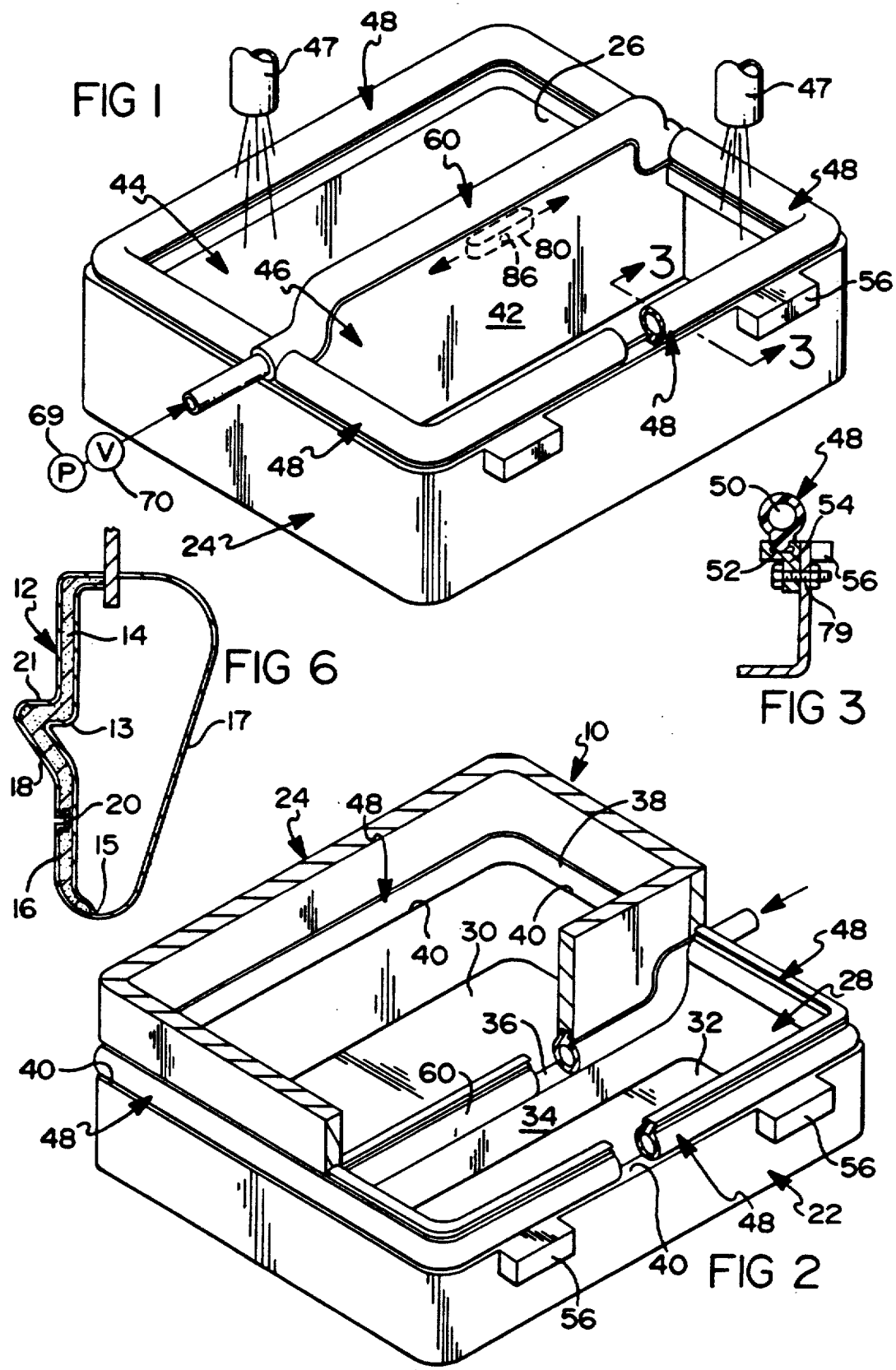

ADJUSTABLE GASKET ALIGNMENT BLOCK

TECHNICAL FIELD

The invention relates to an apparatus for making thin plastic shells especially suitable for use in automobile trim components, such as interior door or instrument panels, and more particularly to two plastic shells having an integrally bonded connector joining the color section at a bond joint therebetween.

BACKGROUND OF THE INVENTION

The automotive industry has turned to the use of interior trim components, such as door panels, comprising a polyvinyl chloride shell. See, for example, the trim components disclosed in U.S. Pat. No. 3,123,403. The acceptance of such components has been because inter alia this type of construction permits a wide latitude in styling and color, and grain effects which are most desirable, particularly in the interior design of automobiles.

The current state of the art includes a preformed grain vinyl shell made from dried thermoplastic powder particles which are applied to a heated shell mold from a powder box to form a continuous one-piece shell.

In order to enhance the interior decor of an automobile, interior door panels and other parts have been prepared which include two separate plastic shell sections joined by a mechanical fastener.

U.S. Pat. No. 4,562,025, issued Dec. 31, 1985, with a common assignee to this present invention, covers a mold method and apparatus for multi-color plastic shells which shell segments have their edges bonded at a particular break-line.

U.S. Pat. No. 4,610,620, issued Sept. 9, 1986 discloses an apparatus for loading and releasing a recharge of two or more colors of thermoplastic color from separate compartments in a charge box for gravity flow into an mold configured to produce two shell segments and a separate overlapping color connector to bond the shell segments to form a one piece shell with two or more color tones to enhance the color of the interior of an automobile. An open-ended charge box is provided with a divider wall to form two separate compartments, each filled with a predetermined quantity of different powder. The mold has a division surface which cooperates with the divider wall to separate the powder content in each compartment of the charge box. The charge box releases the powder from the separate charge box compartments to flow evenly across the open end of the mold by gravity. A fixed gasket seals the division surface and the divider wall so as to produce separate two-tone segments on the heated surfaces of the mold. In theory, the seal gasket keeps the division surface clean for a subsequent application of the material thereagainst to form a connector that bonds the previously cast two-tone segments to form a single piece article with an integral joint between the two-tone segments. In practice, such a fixed gasket must conform to a division surface on each of a number of heated molds. The molds can be heated by suitable means such as hot air units of the type shown in U.S. Pat. No. 4,623,503 dated Nov. 18, 1986. Tolerance differences in the mold dimensions may leave margin gaps between the fixed gasket and the division surface. Powder from the charge box can seep into such gaps onto the division surface to create color smudges in the finish bond connector.

A further assembly utilized by the assignee of the subject invention, includes an inflatable seal gasket which is operative to selectively bridge between the divider wall and the division surface when a charge box and heated mold are connected together. The inflatable seal includes a sealing bead thereon configured to completely cover the division surface to prevent seepage of the powder material from the casting surfaces to the division surface and to prevent resulting color smudges in a subsequently formed connector bond. The assembly solves the prior art problem of seepage onto the division surface due to geometric shape by inflating the gasket. However, a problem with this type of seal gasket is that the gasket is slideable along the divider wall and is allowed to slide therealong at any time proceeding and during the casting operation. The seal gasket may drift and slide out of longitudinal alignment with the division surface and divider wall over a period of time causing leakage or other failures of the gasket, and scrap of shells.

SUMMARY OF THE INVENTION AND ADVANTAGES

The invention is an assembly for molding a two-tone, thin-walled plastic shell in a heated open-ended mold from a charge of thermoplastic powder material in an open-ended charge box. The assembly includes a heated open-ended mold having a rib extending therefrom establishing two separate casting surfaces thereabout, a charge box adapted to be connected to the heated open-ended mold in open-ended relationship to form a closed system for casting the powder material and having a divider wall establishing two sources of the powder material. Also included is seal gasket means longitudinally slideable along the divider wall for selectively bridging between the divider wall and the rib when the heated open-ended mold and the charge box are connected in the closed system. The assembly is characterized by including retaining means selectively secured to said divider wall for receiving and maintaining the sealed gasket means at a predetermined position longitudinally along the divider wall.

The advantages of the invention include that the seal gasket is not able to longitudinally slide out of position thereby preventing failures in the manufacturing of the thin-walled hollow shells and in destruction of the seal gasket or shells.

BRIEF DESCRIPTION OF THE DRAWINGS

Other advantages of the present invention will be readily appreciated as the same becomes better understood by reference to the following detailed description when considered in connection with the accompanying drawings wherein:

FIG. 1 is a perspective view of a charge box and seal assembly of the subject invention;

FIG. 2 is a perspective view of a mold sealed by the charge box of FIG. 1;

FIG. 3 is a fragmentary sectional view of a compression seal in the assembly of FIG. 1 along lines 3—3;

FIG. 6 is a view of a part made by use of the subject invention.

DETAILED DESCRIPTION OF THE PREFERRED EMBODIMENT

Figure 4:
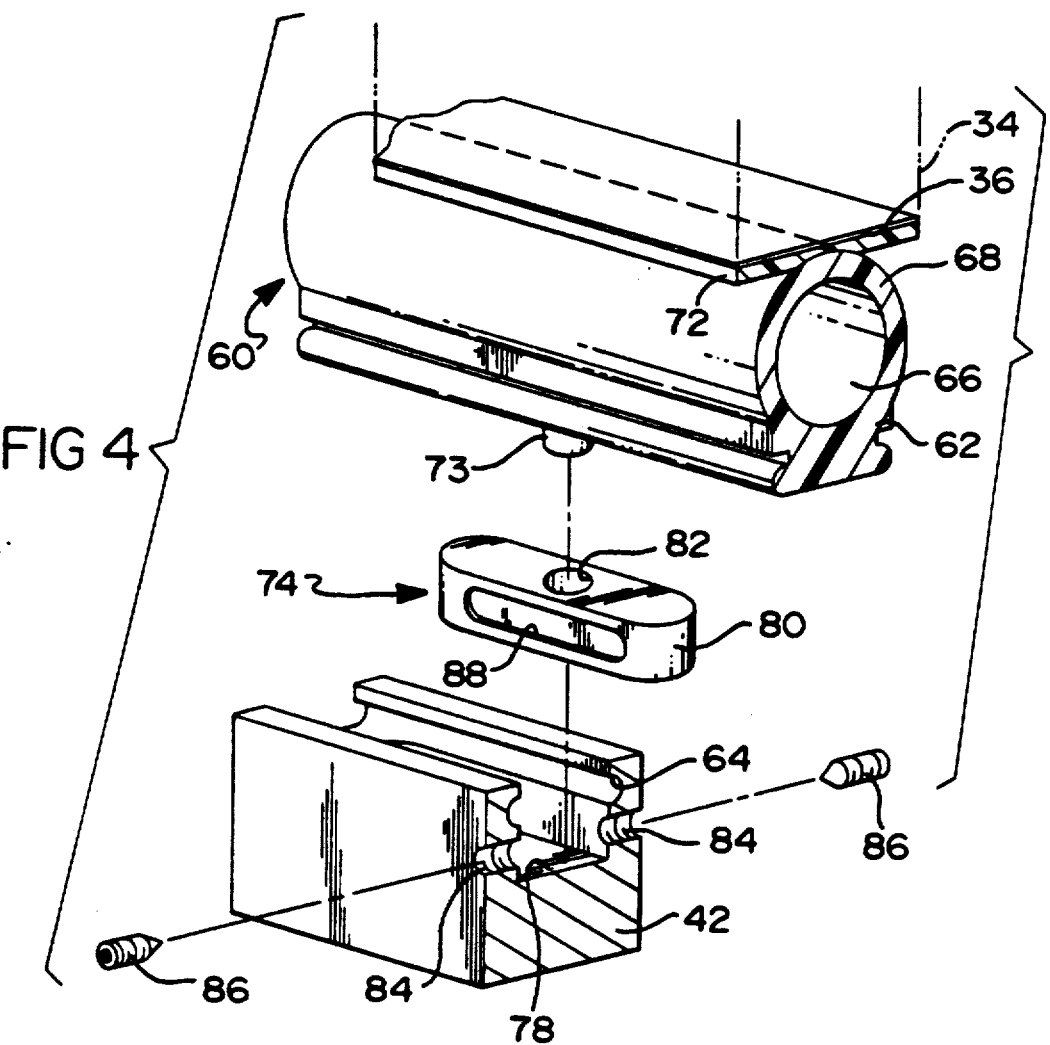
FIG. 4 is an expanded view of the inflatable seal and the retaining means and the divider wall of the charge box.
Figure 5:
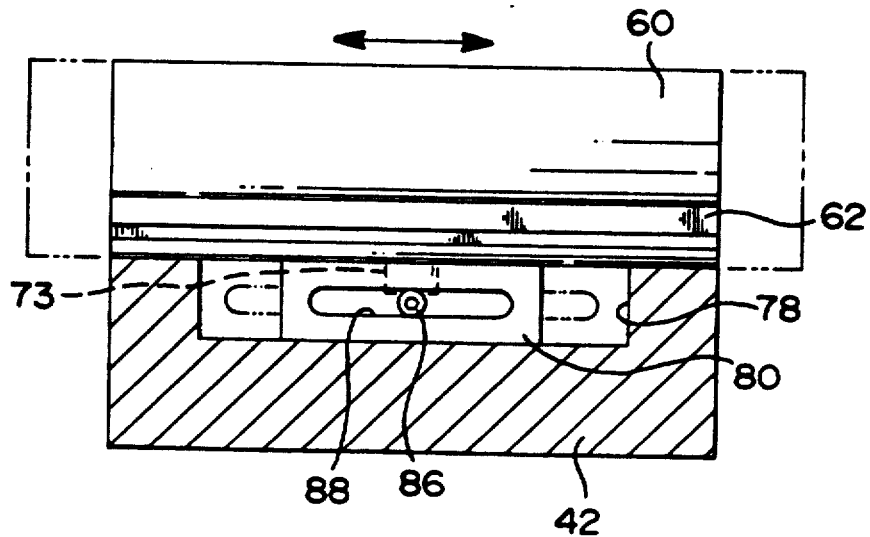
FIG. 5 is a partially cut away side view of the inflatable seal and retaining means with the divider wall.

An assembly 10 for molding a two-tone, thin-walled plastic shell 12 from a charge of thermoplastic powder material is generally illustrated in FIGS. 1 and 2.

The assembly 10 may process a variety of hollow shell parts. FIG. 6 illustrates a typical automobile door panel application of a multi-color, single piece interior plastic shell 12. The assembly 10 is equally suitable for making other interior parts such as instrument panel covers and the like. The shell 12 is preferably made of polyvinyl chloride material and is backed by a layer of polyurethane foam 14 bonded to the shell 12 by a mold process such as in U.S. Pat. No. 3,123,403, issued Mar. 3, 1964 for automobile armrest. An interior reinforcing insert 13 is connected at a joint 15 to an outer door panel 17 to form an interior space for a window lift mechanism (not illustrated) to raise and lower a window.

The shell 12 is a plastic part with an integral lower panel 16 of a dry castable thermoplastic material of a first color and upper panel 18 of a dry castable thermoplastic material of a second color. The shell 12 includes a bonded connector 20 of a selected color that overlaps the lower panel 16 and upper panel 18. The connector 20 is bonded to the lower panel 16 and the upper panel 18. The upper panel 18 can include an arm rest segment 21 formed by a dry castable thermoplastic material having a second color contrasting or complementing the color of the lower panel 16 or other interior components. For example, the upper panel 18 can be red, blue, yellow or beige to contrast with or complement the interior color of the seats, headliners, crash pads and the like. The lower panel 16 can be colored a deeper complementary two-tone color of a character which has a low impact or scuff resistant qualities. The bonded connector 20 can be a color complimentary to the colors of the lower panel 16 and upper panel 18 or the same as one or the other of the panels 16, 18.

The assembly 10 includes a heated open-ended mold 22. A charge or powder box 24 is operated between raised and lowered positions with respect to the mold 22 by suitable handling equipment, exemplified by the type set forth in U.S. Pat. No. 4,664,867. The charge box 24 includes an open end 26 which is configured to cover the planar extent of an opening 28 of the mold 22. Each of the molds 22 is coupled to the powder box 24 once the respective mold 22 has been heated to a casting temperature by suitable heating means.

The heated mold 22 includes a pair of casting surfaces 30, 32 separated by a raised rib 34 therebetween. The rib 34 has a division surface 36 that extends between spaced side walls 38 of the mold 22.

The rib 34 is located below the open edge of the surfaces 40 of the walls 38 of the mold 22. In the illustrated example of the assembly 10, the upper edge surfaces 40 are shown in the same plane. It should be understood that these surfaces 40 may be of different levels depending upon the shape of the thin-walled shell 12 to be casted onto the heated mold 22.

The charge box 24 includes a divider wall 42 which separates the charge box 24 into first and second compartments 44, 46, each of which is configured to be filled with a charge of thermoplastic particles or powder material. FIG. 2 illustrates a fragmentary section of the charge box 24 on the mold 22 to illustrate the relationship thereto during the casting process. The charge in the charge box 24 is a dry thermoplastic material which will melt and bond together when cast against the heated surfaces 30, 32 of the mold 22. In order to maintain separation between the material and each of the compartments 44, 46, the height of the divider wall 42 is greater than the maximum depth of either of the compartments 44, 46. The compartments 44, 46 are filled from diagrammatically illustrated sources 47 of different colors of thermoplastic material.

The charge box 24 further includes side wall gaskets 48. Each gasket 48 has a compression seal segment 50 with a base 52 slideably received for replacement in an extruded retainer 54 connected to the charge box 24 by suitable fasteners. The gaskets 48 seal the perimeter of the charge box 24 to the perimeter of the heated mold 22 when they are clamped together at outwardly direction wall flanges 56 by clamps.

The assembly 10 includes seal gasket means 60 longitudinally slideable along the divider wall 42 for selectively bridging between the divider wall 42 and the rib 34 when the mold 22 and charge box 24 are connected in the closed system. The seal gasket means 60 includes an inflatable seal on the divider wall 42 to seal the division surface 36 and to compensate for dimensional tolerance differences between different mold/powder box 22, 24 combination to assure a positive seal against migration of different color materials from surface 30 to surface 32.

Once the powder box 24 and mold 22 are clamped together, the side wall seals 48 prevent the escape of the powder material from the closed casting system which is rotated by drive means about an axis of rotation to distribute the layer of first and second colored particles of thermoplastic material on the surfaces. The seal 60 is inflated during such casting to prevent the flow of different colored particles between compartments 44, 46 and onto the division surface 36.

The inflatable seal 60 is configured to accomplish several objectives. The inflatable seal 60 includes a base 62 connectable to the divider wall 42 in fixed sealing engagement therewith to seal along the length thereof and to provide a structural base for operation between deflated and inflated positions. The divider wall 42 has a dove-tail groove 64 to receive the base 62 of the seal 60.

The seal 60 also has a hollow core 66 with walls 68 which expand and contract when the core 66 is inflated. Such inflation occurs when the core 66 is selectively connected to a source of pressure 69 by suitable valve control means 70. The seal 60 includes a sealing bead 72 which is held in pressure biased sealing relationship with the division surface 36 during the casting operation.

The sealing bead 72 has a surface thereon which completely covers the division surface 36 when the seal 60 is inflated. Consequently, there are no edge gaps or seepage of the powder material from either of the compartments 44, 46 onto the surface 36 during the casting operation.

When the seal 60 is in its deflated or retracted position, a gap remains between the sealing bead 72 and the division surface 36. In order to bridge the gap and compensate for dimensional tolerance difference in the height of the rib 34 on different molds 22, the hollow core 66 is pressurizeable to expand the walls 68. FIG. 4 shows the inflatable seal 60 in its inflated or expanded position in which the sealing bead 72 is sealingly located on the division surface 36.

The division surface 36 remains covered during the casting process. Consequently, the division surface 36 is clean when the mold 22 is separated from the power box 24.

The assembly 10 includes retaining means 74 for receiving and positioning the seal 60 longitudinally along the divider wall 42 at a predetermined position and for connection to the divider wall 42 to maintain the seal 60 at the predetermined position. The seal 60 includes attachment means 73 for removably attaching the seal 60 to the retaining means 74 at the predetermined position. The attachment means 73 comprises a plug in the preferred embodiment. The retaining means 74 includes a sliding member 80 slideable within a longitudinally extending groove 78 along the divider wall 42 and having a bore 82 therein for receiving the attachment plug 76 for positioning the seal 60 in the predetermined position. The divider wall 42 includes a pair of oppositely disposed threaded apertures 84 extending into the groove 78, and the retaining means 74 includes a pair of set screws 86 extending through a coacting with the threaded apertures 84 for engaging the sliding member 80 to maintain the same in the predetermined position. The sliding member 80 includes longitudinally extending and opposing recesses 88 for receiving the pair of set screws 86.

In operation, the seal 60 is placed within the dove-tail groove 78 with the plug 76 placed within the bore 82 on the sliding member 80. The sliding member 80 is then positioned longitudinally along the divider wall 42 such that the seal 60 is positioned accurately, longitudinally along the charge box 24. The set screws 86 are screwed and tightened against the sliding member 80 within the recesses 88 to secure the sliding member 80 at the adjusted position 80 so that the seal 60 is at the predetermined position. The seal 60 will remain at the predetermined position as long as attached and secured to the sliding member 80. If the seal 60 is removed, reinsertion of the seal 60 will ensure proper positioning of the seal 60 at the predetermined position.

Following the casting operation, a thin layer of material is formed on each casting surface 30, 32 to form separate colored segments 16, 18 such as panels described above. A separate bonding layer of thermoplastic material is then applied to the surface 36 in a known manner by suitable means including paint or rolling a wet slurry of a suitable thermoplastic material or by dry casting the bonding thereon. A resultant in bonded connector 20 is then formed to bridge the gap between the color segments 16, 18 and to bond the segments 16, 18 into one integral part with a precision styling line therebetween while the segments remain in the mold. The final product is removed from the mold as an integral unit.

A typically powder casting process for a 2 color door panel includes the following sequence.
1. preheat mold 22 tool.
2. attach the powder box 24 to the mold 22 when it attains casting temperature to melt the thermoplastic material.
3. rotate charge box 24 and mold 22 to form separate cast segments 16, 18 of two-tone colors.
4. dwell.
5. unclamp.
6. distribute connector bond material against clean, heated division surface.
7. return the mold 22 to a cure oven (or it is heated by hot air by a air processing unit) to fuse connector end to two-tone segments.

Further description of such a process is set forth in the aforementioned '620 patent. Suitable thermoplastic casting material include plasticized polyvinyl chlorides and related vinyl resins in dry powder form or in liquid slurry form for ease of gravity flow from the powder charge box 24 during the cast steps. Typical examples of parts, plastic material and mold processes include the following: PVC resin, plasticizer, stabilizer, release agents and color pigments are combined in a high intensity mixer to produce a dry, flowable powder of each desired color. The process is known in the industry as dry-blending.

The various components constituents may be selected as to type and ratio to provide the properties required both for the finished product and for easy of processing. Physical properties will not be too dissimilar from those obtained with liquid plastisol which is also used to manufacture similar products but has an inherent tendency to force objectional drips and runs when used to make complex shapes.

Processing properties are such that when melting of the plastic powder occurs, densification results in exact reproduction of minute details such as grains, marks and stitches engraved or formed in the mold surface.

Mold preheating temperature may range from 250° F. to 450° F. Since the thickness of the finished product is also governed by the time the powder is in contact of the mold, it should be understood that simultaneous charging of the powder to the mold can be a definite advantage. Also, if certain areas of the mold can be made to have a lower preheated temperature than others, it will permit molding a thinner shell in those areas, since temperature and mold-filled time determine the final thickness of the shell. Therefore, a very flexible range, for mold-filled time, of one second to ten seconds or more has been established.

Depending on formulation, complete melting or fusion of the PVC powder can occur when mold temperatures read 350° F. to 450° F. After fusion, the mold is cooled to a temperature which will facilitate removal of the shell without damage. Specifically, the process and apparatus of the present invention provides even and complete distribution of thermoplastic powder material onto mold surfaces to form large, long, thin-walled, single piece two color or more shells with the pin stripe or common color connector bond to each shell segment for forming a unitary part for interior door panels or instrument panels and the like formed during short cycle mold cycles in limited plant floor space.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

What is claimed is:

1. An assembly for molding a two-tone, thin-walled plastic shell in a heated open-ended mold from a charge of thermoplastic powder material in an open-ended charge box, said assembly comprising:

heated open-ended mold having a rib extending therefrom establishing two separate casting surfaces thereabout, charge box adapted to be connected to said heated open-ended mold in open-ended relationship to form a closed system for casting the powder material and having a longitudinally extending divider wall establishing two sources of the powder material, seal gasket means longitudinally slidable along said divider wall through a plurality of positions for selectively bridging between said divider wall and said rib when said heated open-ended mold and said charge box are connected in the closed system, retaining means secured with said seal gasket means and said divider wall and selectively secured to said divider wall for fixedly receiving and maintaining said seal gasket means at any of the plurality of positions longitudinally along said divider wall wherein said seal gasket means is longitudinally slid along said dividing wall through said plurality of positions and secured at any of said plurality of positions by said retaining means preventing longitudinal sliding of said gasket means.

2. An assembly as set forth in claim 1 wherein said seal gasket means includes attachment means for removably securing said seal gasket means to said retaining means to position said seal gasket means at said fixed predetermined position.

3. An assembly as set forth in claim 2 wherein said divider wall includes a groove extending longitudinal therealong for receiving said retaining means in sliding engagement therein.

4. An assembly as set forth in claim 3 wherein said retaining means includes a sliding member slideable within said groove and having a bore therein for receiving said attachment means for positioning said seal gasket means at said fixed predetermined position.

5. An assembly as set forth in claim 4 wherein said divider wall includes a pair of oppositely disposed threaded apertures extending into said groove, and said retaining means including a pair of set screws extending through and coacting with said threaded apertures for engaging said sliding member to maintain same in said fixed predetermined position.

6. An assembly as set forth in claim 5 wherein said sliding member includes longitudinally extending and opposing recesses for receiving said pair of set screws.

7. An assembly as set forth in claim 6 wherein said attachment means comprises a plug for insertion into said bore.

8. An assembly as set forth in claim 7 wherein said divider wall includes a dove-tail groove for receiving and connecting said seal gasket means to said divider wall.

9. An assembly as set forth in claim 8 wherein said seal gasket means includes an inflatable seal to selectively bridge between said divider wall and said rib when said charge box and said heated mold are connected together.

10. An assembly as set forth in claim 9 wherein said rib includes a division surface, and said seal gasket means including a sealing bead to cover and pressure seal said division surface to prevent leakage of the powder material from said casting surfaces onto said division surface.

11. An assembly for molding a two-tone, thin-walled plastic shell in a heated open-ended mold having a rib extending therefrom establishing separate casting surfaces thereabout from a charge of thermoplastic powder material in an open-ended charge box having a longitudinally extending divider wall establishing a plurality of sources of powder material, said assembly comprising; seal gasket means longitudinally slidable along the divider wall for selectively bridging between the divider wall and the rib when the mold and charge box are connected in a closed system, retaining means operatively connected with said gasket means and longitudinally slidable along and selectively secured to the divider wall for receiving and maintaining said seal gasket means to the divider wall at any of a plurality of positions longitudinally along the divider wall wherein said retaining means is maintained at said position upon securing thereof an removal of said seal gasket means.

12. An assembly as set forth in claim 11 wherein said seal gasket means includes attachment means for removably securing same to said retaining means to position said seal gasket means at said predetermined position.

13. An assembly as set forth in claim 12 wherein said divider wall includes a groove extending longitudinal therealong for receiving said retaining means in sliding engagement therein.

14. An assembly as set forth in claim 13 wherein said retaining means includes a sliding member slideable within said groove and having a bore therein for receiving said attachment means for positioning said seal gasket means at said fixed predetermined position.

15. An assembly as set forth in claim 14 wherein said divider wall includes a pair of oppositely disposed threaded apertures extending into said groove, and said retaining means including a pair of set screws extending through and coacting with said threaded apertures for engaging said sliding member to maintain same in said fixed predetermined position.

16. An assembly as set forth in claim 15 wherein said sliding member includes longitudinally extending and opposing recesses for receiving said pair of set screws.

17. An assembly as set forth in claim 16 wherein said attachment means comprises a plug for insertion into said bore.

* * * * *